United States Patent
Wilson et al.

(10) Patent No.: US 10,328,852 B2
(45) Date of Patent: Jun. 25, 2019

(54) SYSTEMS AND METHODS TO PROVIDE FEEDBACK TO PILOT/OPERATOR BY UTILIZING INTEGRATION OF NAVIGATION AND PHYSIOLOGICAL MONITORING

(71) Applicant: University of North Dakota, Grand Forks, ND (US)

(72) Inventors: Nicholas D. Wilson, Grand Forks, ND (US); Kouhyar Tavakolian, Grand Forks, ND (US)

(73) Assignee: University of North Dakota, Grand Forks, ND (US)

( * ) Notice: Subject to any disclaimer, the term of this patent is extended or adjusted under 35 U.S.C. 154(b) by 0 days.

(21) Appl. No.: 15/153,198

(22) Filed: May 12, 2016

(65) Prior Publication Data
US 2016/0332567 A1    Nov. 17, 2016

Related U.S. Application Data

(60) Provisional application No. 62/160,359, filed on May 12, 2015.

(51) Int. Cl.
| | |
|---|---|
| *G01C 21/00* | (2006.01) |
| *B60Q 9/00* | (2006.01) |
| *G01C 21/16* | (2006.01) |
| *G01S 19/13* | (2010.01) |
| *G01C 21/20* | (2006.01) |

(52) U.S. Cl.
CPC ............... *B60Q 9/00* (2013.01); *G01C 21/16* (2013.01); *G01C 21/20* (2013.01); *G01S 19/13* (2013.01)

(58) Field of Classification Search
None
See application file for complete search history.

(56) References Cited

U.S. PATENT DOCUMENTS

| | | |
|---|---|---|
| H1039 H | 4/1992 | Tripp, Jr. et al. |
| 5,732,134 A | 3/1998 | Sib |
| 5,815,070 A * | 9/1998 | Yoshikawa ............ G08B 21/06 180/272 |
| 5,821,860 A * | 10/1998 | Yokoyama ........... B60K 28/066 340/439 |

(Continued)

*Primary Examiner* — Truc M Do
(74) *Attorney, Agent, or Firm* — Schwegman Lundberg & Woessner, P.A.

(57) ABSTRACT

A system and method is described for improving situational awareness, fatigue management, and navigation via tactile feedback to vehicle operators, such as via a piezoelectric device. The tactile feedback may be provided to a vehicle operator in response to data gathered from external, headset integrated or aircraft integrated navigation sensors, such as may be used to identify navigational deviations outside of pre-established tolerances. The tactile feedback may be provided to a vehicle operator in response to physiological operator metric gathering and processing. One or more physiological sensors may be included on an operator headset, and may be either proximate to or separated from the tactile feedback device. As data is provided to the operator of a vehicle, equivalent data may be provided to a third party (e.g. a control center, dispatch, mission control, or similar). The data may be used to determine alertness levels remotely and intervene as necessary.

18 Claims, 3 Drawing Sheets

(56) References Cited

U.S. PATENT DOCUMENTS

| | | | |
|---|---|---|---|
| 6,974,326 B2* | 12/2005 | Marple-Horvat | A61B 5/18 340/575 |
| 6,974,414 B2* | 12/2005 | Victor | A61B 3/113 340/576 |
| 7,692,550 B2* | 4/2010 | Bonefas | A61B 5/18 340/575 |
| 7,692,551 B2* | 4/2010 | Bonefas | G06T 7/0004 340/575 |
| 8,164,464 B2 | 4/2012 | Matos | |
| 8,515,600 B1* | 8/2013 | McCusker | G01S 13/94 340/963 |
| 8,655,004 B2* | 2/2014 | Prest | H04R 1/028 381/380 |
| 8,698,639 B2* | 4/2014 | Fung | B60K 28/06 340/576 |
| 8,766,819 B2 | 7/2014 | Dorfmann et al. | |
| 8,957,779 B2* | 2/2015 | Wu | G08B 21/06 340/575 |
| 9,129,500 B2 | 9/2015 | Tenenbaum et al. | |
| 9,336,535 B2* | 5/2016 | Pradeep | A61B 5/0476 |
| 9,696,801 B2* | 7/2017 | Donaldson | G06F 3/013 |
| 9,746,984 B2* | 8/2017 | Stafford | G06F 3/012 |
| 9,747,500 B2* | 8/2017 | Andersen | G06K 9/00617 |
| 9,751,534 B2* | 9/2017 | Fung | B60W 40/08 |
| 9,763,614 B2* | 9/2017 | Geller | A61B 5/18 |
| 9,767,373 B2* | 9/2017 | Yang | G06K 9/00845 |
| 9,771,081 B2* | 9/2017 | Grube | B60W 40/08 |
| 2001/0031930 A1* | 10/2001 | Roizen | A61B 5/18 600/544 |
| 2003/0016145 A1* | 1/2003 | Bateman | B64D 43/02 340/967 |
| 2003/0222887 A1* | 12/2003 | Wilkins, Jr. | G01C 23/005 345/618 |
| 2004/0002638 A1* | 1/2004 | Yanagidaira | A61B 5/18 600/300 |
| 2004/0015274 A1* | 1/2004 | Wilkins, Jr. | G01C 23/005 701/3 |
| 2006/0080004 A1* | 4/2006 | Cheok | G01C 15/14 701/1 |
| 2006/0259206 A1* | 11/2006 | Smith | A61B 3/113 701/1 |
| 2008/0071177 A1* | 3/2008 | Yanagidaira | A61B 5/024 600/483 |
| 2008/0174451 A1* | 7/2008 | Harrington | G08B 21/06 340/905 |
| 2008/0177197 A1 | 7/2008 | Lee et al. | |
| 2008/0228333 A1* | 9/2008 | De Menorval | G05D 1/0005 701/14 |
| 2010/0033333 A1* | 2/2010 | Victor | A61B 3/113 340/576 |
| 2010/0049066 A1* | 2/2010 | Hatakeyama | A61B 5/18 600/509 |
| 2011/0117903 A1* | 5/2011 | Bradley | H04M 1/6075 455/418 |
| 2011/0213511 A1* | 9/2011 | Visconti | B60W 40/09 701/1 |
| 2012/0075122 A1* | 3/2012 | Whitlow | A61B 5/18 340/963 |
| 2012/0150429 A1 | 6/2012 | Siotos | |
| 2013/0323688 A1 | 12/2013 | Whitlow et al. | |
| 2014/0039730 A1 | 2/2014 | Loubiere et al. | |
| 2014/0072136 A1 | 3/2014 | Tenenbaum et al. | |
| 2014/0107932 A1 | 4/2014 | Luna | |
| 2014/0152792 A1* | 6/2014 | Krueger | A61M 21/00 348/78 |
| 2014/0276090 A1* | 9/2014 | Breed | A61B 5/18 600/473 |
| 2014/0350431 A1* | 11/2014 | Hagedorn | A61B 5/0478 600/544 |

* cited by examiner

SYSTEMS AND METHODS TO PROVIDE FEEDBACK TO PILOT/OPERATOR BY UTILIZING INTEGRATION OF NAVIGATION AND PHYSIOLOGICAL MONITORING

PRIORITY

This application claims the benefit of U.S. Provisional Application Ser. No. 62/160,359, filed May 12, 2015, entitled "Systems and Methods for Pilot/Operator Navigation Augmentation and Physiological Monitoring," which application is incorporated herein by reference in its entirety.

BACKGROUND

Situational awareness and fatigue management are significant considerations within the aviation industry. These considerations are applicable to commercial aviation (e.g., larger aircraft), especially for single pilot operations, for operations within instrument meteorological conditions (IMC), or for operations within complex airspace, such as busier airports in the National Airspace System (e.g., Class B Airspace).

These considerations are also applicable to "general aviation" (e.g., smaller aircraft, or "GA"), which often involve single pilot operations without autopilot, and therefore without the protections provided by autopilot automation. Additionally, acquisition cost or certification of autopilot in older aircraft may prevent installing autopilot on selected makes or models of GA airplanes.

Situational awareness and fatigue management are significant considerations beyond the aviation industry, such as applications in commercial trucking, maritime tanker, military applications, or other applications. Situational awareness may include real-time guidance information, which may be provided to a vehicle operator (e.g., pilots, drivers). For example, guidance information may include a heading correction (e.g., instruction to climb, descend, turn left, or turn right), and the heading correction information may be delivered in radio silence. Delivering a heading correction in radio silence may prevent the need for an operator to reference another instrument, allowing vision to be maintained on external focal points or other targets. Guidance information may also be provided to a third party (e.g. dispatcher, mission planner, control center, air traffic control, another company location, or other interested stakeholder) to monitor or provide additional navigation direction. Some awareness solutions may be used by private citizens who drive long distances or who are prone to driving while drowsy. Similarly, the insurance industry may have substantial interest in situational awareness and fatigue management, as it may be used to improve safety and reduce risks of operator accident or operator error due to fatigue or physiological impairment.

What is needed in the art is an improvement to situational awareness and fatigue management for vehicle operators.

DETAILED DESCRIPTION

Figure 1:
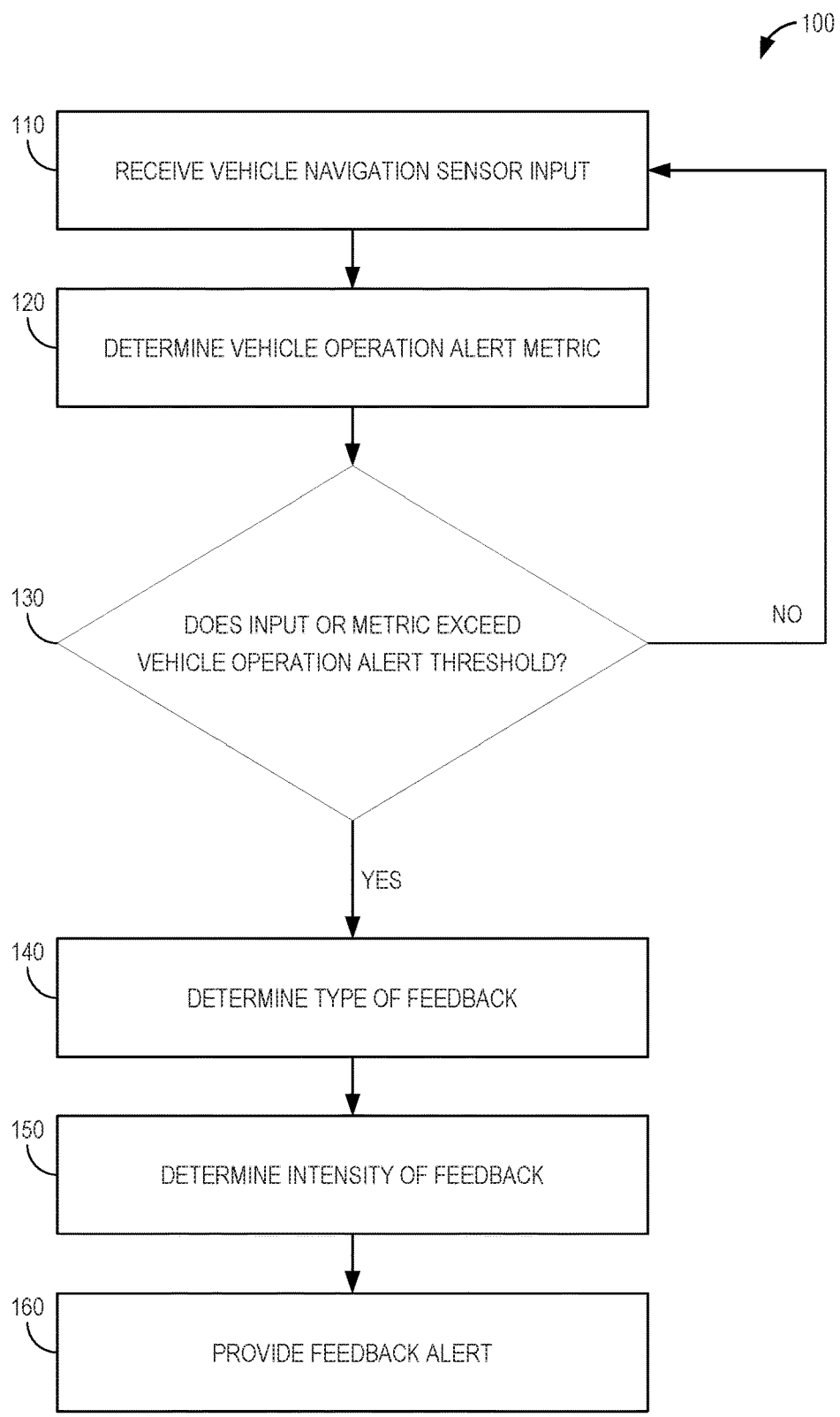
FIG. 1 shows a method of providing a navigation feedback alert, according to an example embodiment.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

The systems and methods described herein are directed to improving situational awareness, fatigue mitigation, and navigation. These systems and methods may aid in complying with Federal Aviation Administration (FAA) requirements for flight limitations and rest requirements, as described in 14 C.F.R. § 117. Improvements described herein include receiving sensor data and providing feedback to vehicle operators or third parties. For example, feedback mitigation may include mitigating various symptoms or effects of fatigue through generating and delivering alerts to vehicle operators. Feedback may include any combination of tactile feedback, audio feedback, visual feedback, thermal feedback, or any other type of feedback. Some large transport category aircraft (e.g., Boeing) or higher performance business jets (e.g., Hawker, Learjet, Bombardier) respond to extreme operational conditions in which the aircraft is near stall (low aircraft speed or low energy condition), by providing aggressive vibration feedback to warn the crew of impending stall. This aggressive vibration feedback is provided through the entire aircraft control stick or yoke, and is referred to as a "stick shaker," and may be combined with an aggressive and directed attitude correction referred to "stick pusher." However, such aggressive corrections are reactive to potentially deadly stall conditions, and the feedback motion is attention-grabbing or shocking through substantial vibrations felt through the hands and arms. In contrast to this reactive, extreme, and simplistic feedback technology, the present subject matter is directed to provide preventative feedback to sensitive body areas (e.g., the head) whose motion is subtle and complex in order to convey specific information. This preventative feedback may be implemented via a series of vibration-inducing devices (e.g., piezoelectric devices, eccentric rotating mass vibration motors, linear resonant actuators, etc.) embedded in the ear seal of aviation headsets or other body-contacting surfaces, and may be used during normal operational conditions to prevent extreme conditions (e.g., stall, loss of control, lateral/vertical navigation deviations, or loss of consciousness) from developing.

The tactile feedback may be provided to a vehicle operator in response to data gathered from external navigation sensors. Some navigation sensors may be used to identify navigational deviations outside of previously established tolerances. Navigation devices may be capable of translating three-dimensional guidance information, such as an attitude and heading reference system (AHRS) navigational sensing unit remotely mounted on the aircraft and equipped with communication hardware. The AHRS information may be conveyed to the pilot operator via Flight Deck Equipment (e.g., an aviation headset) equipped with a piezoelectric device integrated into the ear seal of the headset. If the pilot or operator deviates from heading or altitude intentionally or unintentionally by a pre-determined amount or rate, a series of programmed vibrator pulses would be transmitted to the skin of the flight crew via the piezoelectric devices. Tactile feedback may be integrated into sophisticated navigational systems and devices, such as those manufactured by Garmin, Lowrance, Thales, Collins, Honeywell, Avidyne, Bendix King, ForeFlight Software, Stratus ADS-B technology, or other manufacturers. Tactile feedback may be integrated into Flight Management Systems (FMS) of larger aircraft, into Instrument Landing System (ILS) glideslope and localizer tracking, into very high frequency omnidirectional radio range (VOR) course navigation, or into area navigation (RNAV), RNAV augmented with Global Positioning Systems (GPS RNAV), RNAV augmented with Required Navigation Performance (RNP RNAV), Traffic Collision Avoidance Systems (TCAS), Terrain Awareness and Warning Systems (TAWS), or enhanced Ground Proximity Warning Systems (eGPWS).

The tactile feedback may be provided to a vehicle operator in response to a physiological operator metric. For example, operator physiological data relating to fatigue or alertness measurements may be collected, such as to assess psychological fitness of the pilot/operator, or may be sent to a third party for safety or insurance analysis. Physiological data may be collected using various sensors, such as a ballistocardiogram (BCG) sensor, a seismocardiogram (SCG) sensor, an electroencephalogram (EEG) brain activity sensor, electrocardiogram (ECG) an electrooculogram (EOG) eye-measurement sensor, a pulse plethysmogram (PPG) sensor, a pulse oximetry sensor, an electromyogram (EMG) sensor, a functional near infrared (FNIR) sensor, a skin-sensitive potentiometer, a microelectromechanical (MEMS) accelerometer sensor, or other sensors. For example, MEMS accelerometers may be used to collect data indicating angular or linear head motion, and the measured data could be recorded and analyzed to identify fatigue-likely conditions or flight crew warnings. Ballistocardiogram sensor data or skin-sensitive potentiometer data may be used to record heart rhythms, and the heart rhythms may be used to identify sleep cycles, wake cycles, and intermediate stages between sleep or wake cycles. Pulse oximetry sensor data or PPG sensor data may be used to determine blood oxygen saturation values or changes, and may be used for measurement or evaluation of hypoxia (i.e., insufficient blood oxygen) or risk for hypoxic (low-oxygen) vehicle environments. Heart rate variability techniques may be used to analyze the data relevant to the heart (e.g., from ECG, BCG, or SCG sensors). One or more physiological sensors may be included within a helmet or operator headset, and may be either proximate to or separated from the tactile feedback device. For example, one or more EEG brain activity sensors may be included in the ear seals and headband of an operator headset, and may be sufficiently separated from one or more tactile feedback devices to minimize interference with EEG collected data.

FIG. 1 shows a method 100 of providing a feedback alert, according to an example embodiment. Method 100 may include receiving 110 a vehicle operation input from a vehicle navigation sensor. The vehicle operation input may include a vehicle steering input, such as an accelerometer placed on an automotive steering wheel or an airplane control yoke. The vehicle operation input may include a vehicle navigation sensor input, such as a position provided by a Global Positioning Satellite (GPS) navigation device, AHRS, or air data sensing technology (e.g., pitot or static air measurement).

Method 100 may include determining 120 a vehicle operation alert metric based on the vehicle operation input. The alert metric may be determined 120 based on a combination of the current vehicle operation input and past vehicle operation inputs. For example, a current acceleration measurement may be compared to a previous acceleration measurement to calculate a change in acceleration (i.e., "jerk"), or a current acceleration measurement may be window-averaged with a predetermined number of previous measurements. The alert metric may be determined 120 based on the vehicle operation input and various other inputs. For example, the alert metric may be a combination of acceleration and steering input, where the metric may discount the input acceleration by the acceleration expected based on the steering input. The alert metric may be determined 120 based on the vehicle operation input and other stored or collected data. For example, the alert metric may be a heading deviation relative to a planned route, where the heading deviation may be calculated as a function of current and predicted heading for a vehicle in a particular location along a planned route. The alert metric may be determined 120 based on whether the operator is currently providing an operator input, is not currently providing an operator input, or is providing control inputs that are inappropriate for the present navigation.

Method 100 may include comparing 130 the vehicle operation input or the vehicle operation alert metric to a vehicle operation alert threshold. In an example, the vehicle operation input may include a vehicle steering input, and the vehicle operation alert threshold may include a maximum steering deviation threshold. In another example, the vehicle navigation sensor may be a GPS receiver. The system may receive 110 a calculated position from the GPS receiver, an alert metric may be determined 120 by comparing the current position to a previous position, and a comparison 130 may indicated that the position alert metric exceeded a maximum position deviation. In yet another example, the vehicle navigation sensor may be an attitude and heading reference system (AHRS), where the AHRS may provide navigation information, such as a calculated attitude input including a roll input, a pitch input, and a yaw input. The raw input may be compared 130 to the vehicle operation alert threshold, where the threshold may include a maximum heading deviation amount, a maximum heading deviation rate, or another threshold. In other examples, the system may receive 110 an air data input including air pressure, altitude, vertical speed, airspeed, or angle of attack (AOA), or the system may receive 110 localizer or glideslope information from an Instrument Landing System (ILS), lateral and vertical paths (e.g. RNP approaches) provided by a capable GPS receiver, or magnetic course information from a VHF Omni-Directional Range (VOR) navigational aid. The raw air data input may be compared 130 against one or more landing minimum thresholds, where a landing minimum threshold may be a minimum altitude used during an instrument approach. For example, the landing minimum threshold may correspond to an altitude at which the operator must decide whether to proceed with the landing or to execute a missed approach. The landing minimum threshold may be 1,000 feet, 500 feet, 200 feet, 100 feet, or other altitudes. The landing minimum threshold may be provided as a Decision Altitude (DA) or Decision Height (DH) from a RADAR Altimeter (RA), a Minimum Descent Altitude (MDA) for a non-precision approach, or a Vertical Protection Limit (VPL) from a Ground-Based Augmentation System (GBAS). One or more of the inputs received 110 may be combined to determine 120 an alert metric, and a comparison 130 may indicate that the combined alert metric exceeds a corresponding operation alert threshold. The vehicle operation alert threshold may be statically defined or dynamically adjustable. For example, a local vehicle operator or remote vehicle dispatch may adjust the vehicle operation alert threshold based on time of day, type of vehicle, type of operation (e.g., visual or instrument conditions), or other parameters.

Method 100 may include determining 140 a type of feedback. For example, the feedback may include providing a tactile vibrating pulse using a piezoelectric device, where a piezoelectric device may be integrated into a headset ear seal to transmit the vibrating pulse to a skin surface of the vehicle operator. A headset ear seal may be designed or selected to accommodate one or more feedback devices. For example, headset ear seals may include "carve outs" (e.g., notches) or flexible areas to accommodate wearing sunglasses or other eyewear while minimizing environmental sound within the headset, and the headset ear seals may include feedback devices in locations that do not interfere with the carve outs. Additionally, the carve outs may improve the signal quality of the embedded physiological sensors, as the carve outs reduce the amount of displacement away from the skin surface induced through wearing specific types of eyewear. The piezoelectric or other feedback device may be integrated into a headset, within a helmet, within glasses or other eyewear, attached to portion of a uniform, or may be a standalone feedback device attached to the user. The tactile feedback may be configured to provide a generalized notification, or may be configured to communicate an event-specific notification. For example, a vehicular heading deviation may be indicated by a pulse delivered to the left or right side of a headset, where the headset side is selected to encourage the driver to correct heading in a specific direction. Similarly, an avionic attitude deviation may be indicated by a pulse delivered to the top, bottom, front, or back of one or both ears to encourage the pilot to correct the attitude in a specific direction. For example, an attitude deviation may include a yaw or heading deviation, and the corrective pulse may be delivered to the side of the head corresponding to the direction of the desired correction. Various combinations of pulses may be used, such as a pitch correction indicated by separate pulses above each ear, or a roll correction indicated by a pulse above one ear and below the other ear. For example, to suggest a clockwise roll correction, a pulse may be delivered above the left ear while another pulse is delivered below the right ear. The tactile feedback may be configured to initiate or direct head motion and visual attention in a specific direction. For example, an Automated Dependent Surveillance-Broadcast (ADS-B) system or Traffic Collision Avoidance System (TCAS) system may compare the aircraft heading with possible conflict traffic, and the tactile feedback may assist the operator in positioning the head in the correct location to observe and avoid traffic conflicts. In another example, gyroscopes and accelerometers are used to determine head orientation and movement (e.g., tilt, rotation), and tactile feedback is used in combination with the sensors to determine an amount of head movement and change or reduce the tactile feedback when attention is placed in a specific direction. Various sensors and feedback mechanisms may be integrated into operator-worn equipment, such as integrating sensor and feedback devices into a helmet or eyewear. In an example, "smart" glasses may include accelerometers or other sensors for detecting head orientation and movement, may include EEG or EOG sensors for detecting pupil and eyelid movement, and may project feedback via a heads-up display visible to the vehicle operator.

Method 100 may include determining 150 an intensity of feedback. The tactile feedback type or intensity may be modified to convey various types of information, such as alert type, severity, other alert characteristics, or other information. A minor alert may use a repeating vibration pattern of low magnitude, such as a light vibration using a fifty percent duty cycle (e.g., on and off for equal time). A potentially life-threatening alert may use an irregular vibration pattern of higher magnitude, and may use both tactile and audible feedback. While this application discusses providing a tactile feedback, other types of feedback may be used. For example, any combination of audible feedback, visual feedback, thermal feedback, tactile feedback, or other type of feedback may be used to provide information to the vehicle operator. This information, such as exceedance of threshold limits or pre-determined operator physiological definitions, may also be provided to third parties for monitoring or other purposes.

Method 100 may include providing 160 a feedback alert. The feedback alert may be provided to a vehicle operator or to a third party when the operation alert metric exceeds the vehicle operation alert threshold. In an example, vehicle navigation sensor data may be received 110 from a vehicle, and the feedback alert may be provided 160 to the operator of the vehicle using one or more of the feedback types or intensities described above. In some examples, the vehicle operator may be in a different location than the vehicle, such as an unmanned vehicle controlled by an operator in a remote systems operational control center (e.g., a vehicle dispatch). For example, vehicle navigation sensor data may be received 110 from an unmanned vehicle, provided to a control center, and provided to a remote vehicle operator. This remote feedback may include proprioceptive feedback, which provides the remote vehicle operator with a sense of position, movement, or acceleration. This remote feedback may take the place of traditional proprioceptive feedback, which would have been otherwise experienced by the operator in the physical confines of the moving vehicle. Other examples of remote operation may include a first vehicle operator within a vehicle and a backup vehicle operator in a remote control center, a vehicle operator residing in a nearby vehicle, a single vehicle operator managing two or more vehicles, or other variations of remote vehicle operation. The distribution of sensors and feedback devices offers various advantages. For example, a battery-powered headset may improve battery life by processing data in a vehicle dashboard or remote location powered by a separate electrical source. Navigation sensors may be separated from a headset to improve data integrity, such as using an altimeter or a magnetometer heading sensor resting on or mounted within a vehicle dashboard or vehicle chassis. Feedback device may be separated to improve feedback reliability, such as by augmenting a headset feedback device with a vehicular dashboard audible or visual indicator.

Figure 2:
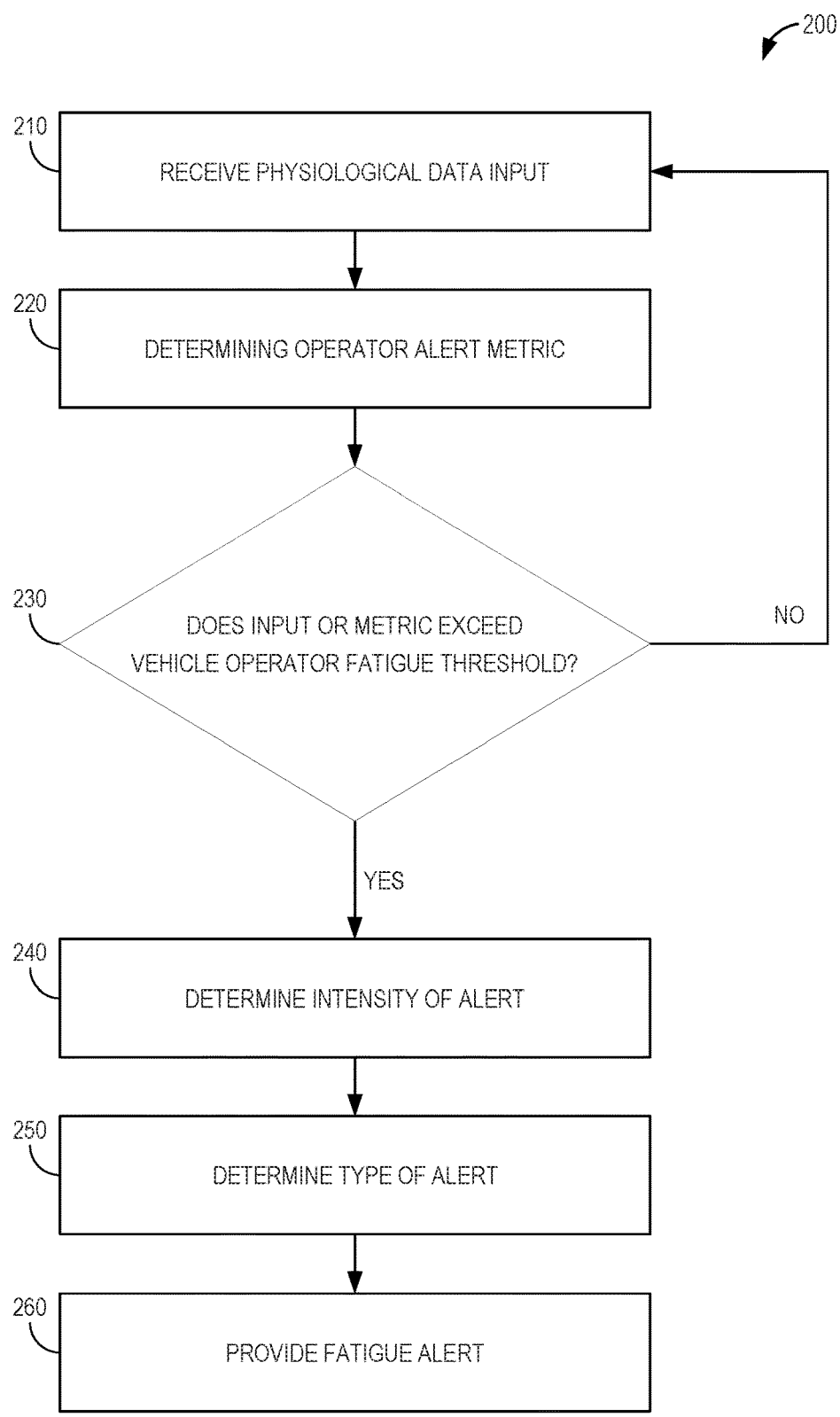
FIG. 2 shows a method of providing a physiological feedback alert, according to an example embodiment.

FIG. 2 shows a method 200 of providing a physiological feedback alert to a vehicle operator, according to an example embodiment. Method 200 may include receiving 210 a physiological data input from the vehicle operator. The physiological data input may include sensors described above, such as a BCG sensor, a SCG sensor, an EEG sensor, an ECG sensor, an EOG sensor, a PPG sensor, an EMG sensor, a FNIR sensor, a skin potentiometer, a MEMS sensor, or another input.

Method 200 may include determining 220 a vehicle operator alert metric based on the physiological data input. The operator alert metric may be determined 120 based on a combination of the current physiological input and past physiological inputs. For example, a current acceleration measurement may be compared to a previous acceleration measurement to calculate a change in acceleration, where the acceleration may be indicative of head motions relating to falling asleep. The alert metric may be determined 220 based on a combination of the physiological input and various other inputs or stored data.

The alert metric may be determined 220 based on a physiology baseline, where the physiology baseline is specific to each operator. To determine a physiology baseline, operator physiological signals may be recorded in alert condition (e.g., physically conscious and interacting with the environment), and may be used as a baseline physiological signature for that individual operator. The thresholds for triggering an alert or alarm may be adapted to the signature of each individual to increase the sensitivity of the system. For example, the baseline determination may be determined within the first three to five minutes of mounting the device on the head in the active condition (e.g., armed) while measuring normal activity levels.

Method 200 may include comparing 230 the physiological input or the vehicle operator alert metric to a vehicle operator fatigue threshold. One or more of the physiological inputs received 210 may be combined to determine 220 an alert metric, and a comparison 230 may indicate that the combined alert metric exceeds a corresponding vehicle operator fatigue threshold. The vehicle operator fatigue threshold may be statically defined or dynamically adjustable. For example, a local vehicle operator or remote vehicle dispatch may adjust the vehicle operator fatigue threshold based on time of day, type of vehicle, type of operation (visual or instrument conditions), or other parameters.

Method 200 may include determining 240 a type of alert. For example, the alert may include providing a tactile vibrating pulse using a piezoelectric device, where a piezoelectric device may be integrated into a headset ear seal to transmit the vibrating pulse to a skin surface of the vehicle operator. As described above, the headset ear seal may include carve outs and feedback devices in locations that do not interfere with the carve outs. Additionally, the carve outs may improve the signal quality of the embedded physiological sensors as they reduce the amount of displacement away from the skin surface induced through wearing specific types of eyewear. The piezoelectric or other fatigue alert device may be integrated into a headset, within a helmet, within glasses or other eyewear, attached to portion of a uniform, or may be a standalone feedback device attached to the user. Providing 260 the feedback alert may also include determining 250 an intensity of alert. The tactile alert feedback type or intensity may be configured to provide a generalized notification, or may be configured to communicate an event-specific notification. The tactile feedback may be modified to indicate alert type, severity, or other alert characteristics. A minor alert may use a repeating vibration pattern of low magnitude, such as a light vibration using a fifty percent duty cycle in response to detection of preliminary stages of fatigue. A potentially life-threatening fatigue alert may use an irregular vibration pattern of higher magnitude, and may provide both tactile and audible feedback. Any combination of audible feedback, visual feedback, or tactile feedback may be used to provide information to the vehicle operator. This information, such as exceedance of threshold limits or pre-determined operator physiological definitions, may also be provided to third parties for monitoring or other purposes.

Method 200 may include providing 260 a fatigue alert. The fatigue alert may be provided to the vehicle operator or third party when the vehicle operator alert metric exceeds the vehicle operator fatigue threshold. The fatigue alert may be configured to increase a vehicle operator alertness level. The fatigue alert may be provided to a vehicle operator or to a third party when the operation alert metric exceeds the vehicle operation alert threshold. The raw physiological data, the operation alert metric, and the fatigue alert may be recorded at the vehicle or in a remote location, such as for use in post-accident investigation. In an example, data may be communicated between the vehicle and a remote location using a vehicle data communication system, such as using an Aircraft Communications Addressing and Reporting System (ACARS).

In an example, physiological sensor data may be received 210 from a vehicle, and the fatigue alert may be provided 260 to the operator of the vehicle using one or more of the feedback types or intensities described above. In some examples, the vehicle operator may be in a different location than the vehicle, such as an unmanned vehicle controlled by an operator in a remote systems operational control center. For example, physiological data may be received 210 from a remotely operated vehicle, provided to a control center, and provided to control center personnel.

Figure 3:
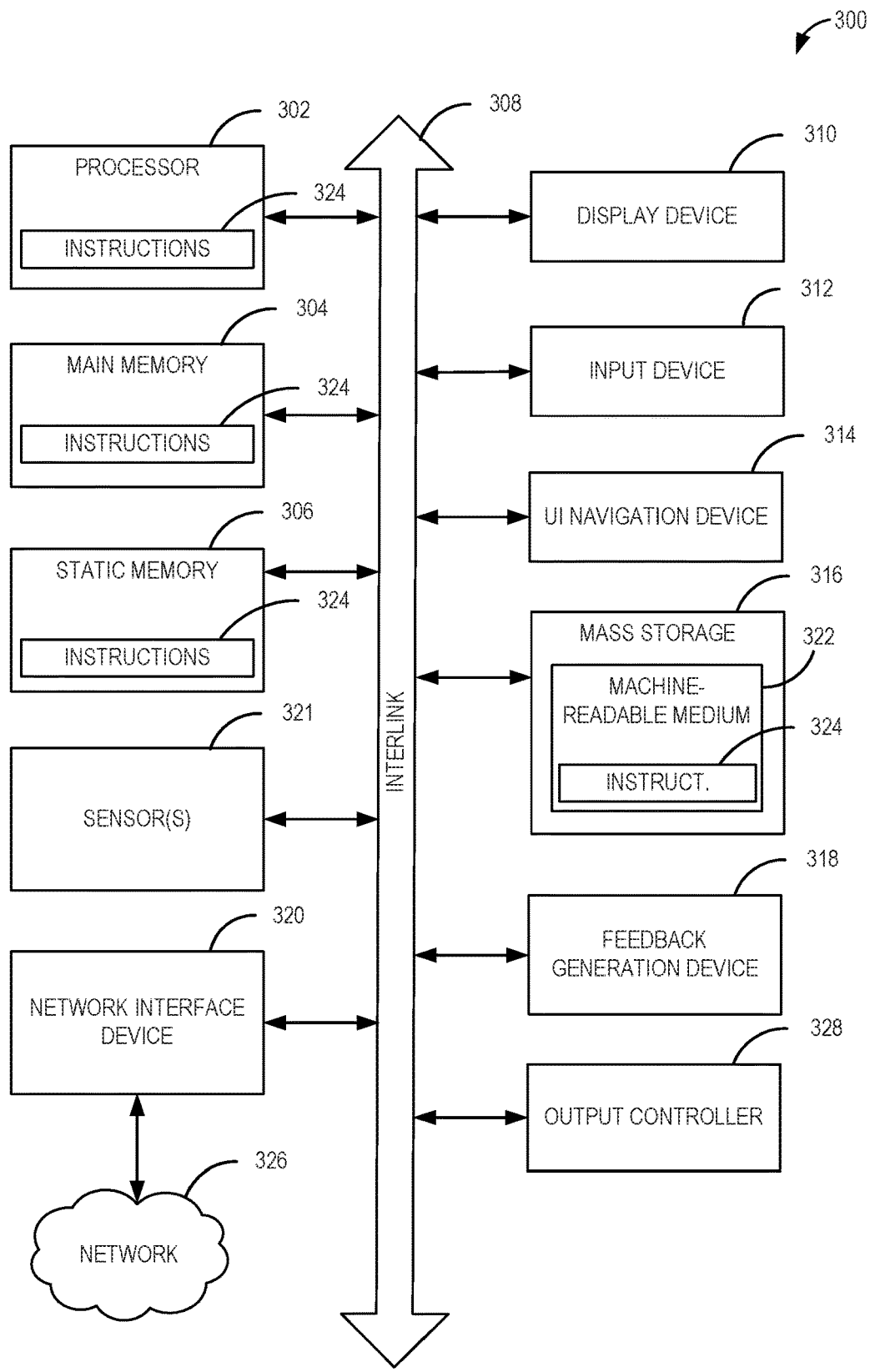
FIG. 3 is a block diagram illustrating an example of a machine upon which one or more embodiments may be implemented.

FIG. 3 is a block diagram 300 illustrating an example of a machine, upon which one or more embodiments may be implemented. Though a machine is described, the components within the block diagram 300 may be implemented on a chipset, such as on an integrated circuit (IC). Implementation of these components within a chipset may enable various improvements in efficiency. For example, various methods described herein may be implemented in firmware and executed in parallel on a dedicated chipset, which may provide improved efficiency over a purely software-based implementation.

In some embodiments, the machine 300 may operate as a standalone device or may be connected (e.g., networked) to other machines. In a networked deployment, the machine 300 may operate in the capacity of a server machine, a client machine, or both in server-client network environments. In an example, the machine 300 may act as a peer machine in peer-to-peer (P2P) network environment or other distributed network environment. The machine 300 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 300 may include a hardware processor 302 (e.g., a central processing unit (CPU), a graphics processing unit (GPU), a hardware processor core, or any combination thereof), a main memory 304 and a static memory 306, some or all of which may communicate with each other via an interlink (e.g., bus) 308. The machine 300 may further include a display unit 310, an alphanumeric input device 312 (e.g., a keyboard), and a user interface (UI) navigation device 314 (e.g., a mouse). In an example, the display unit 310, input device 312 and UI navigation device 314 may be a touch screen display. The machine 300 may include a storage device (e.g., drive unit) 316.

The machine 300 may include a signal generation device 318 that may be used to provide a tactile feedback alert to a vehicle operator. The signal generation device 318 may provide vibration feedback, sound feedback, or other feedback. The signal generation device 318 may be a piezoelectric device, a mechanical buzzer, a vibration motor with an unbalanced rotary mass, or another device.

Machine 300 may include a network interface device 320. Machine 300 may include one or more vehicle navigation operation or operator physiological sensors 321. For example, sensors 321 may include a GPS sensor, compass, magnetometer, accelerometer, gyroscope, BCG sensor, SCG sensor, EEG sensor, ECG sensor, EOG sensor, a PPG sensor, an EMG sensor, a FNIR sensor, skin potentiometer, MEMS accelerometer, any of several types of air data sensors (angle of attack (AOA), pitot, static, total air temperature (TAT), standard air temperature (SAT), icing conditions detector) or other sensors. The machine 300 may include an output controller 328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 316 may include a machine-readable medium 322 on which is stored one or more sets of data structures or instructions 324 (e.g., software) embodying or used by any one or more of the techniques or functions described herein. The instructions 324 may also reside, completely or at least partially, within the main memory 304, within static memory 306, or within the hardware processor 302 during execution thereof by the machine 300. In an example, one or any combination of the hardware processor 302, the main memory 304, the static memory 306, or the storage device 316 may constitute machine-readable media.

Although the machine-readable medium 322 is illustrated as a single medium, the term "machine-readable medium" may include a single medium or multiple media (e.g., a centralized or distributed database, or associated caches and servers) configured to store the one or more instructions 324.

The term "machine-readable medium" may include any medium that is capable of storing, encoding, or carrying instructions for execution by the machine 300 and that cause the machine 300 to perform any one or more of the techniques of the present disclosure, or that is capable of storing, encoding, or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 324 may further be transmitted or received over a communications network 326 using a transmission medium via the network interface device 320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 320 may include one or more physical jacks (e.g., Ethernet, coaxial, or phone jacks) or one or more antennas to connect to the communications network 326. In an example, the network interface device 320 may include a plurality of antennas to communicate wirelessly using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 300, and includes digital or analog communications signals or other intangible medium to facilitate communication of such software.

Additional Notes & Example Embodiments

Example 1 is a method of providing a vehicle operator alert, the method comprising: receiving a vehicle operation input from a sensor; determining a vehicle operation alert metric based on the vehicle operation input; comparing the vehicle operation alert metric to a vehicle operation alert threshold; and providing a vehicle operator alert when the operation alert metric exceeds the vehicle operation alert threshold.

In Example 2, the subject matter of Example 1 optionally includes wherein: the sensor includes a vehicle navigation sensor; and the vehicle operation input includes a vehicle navigation sensor input.

In Example 3, the subject matter of any one or more of Examples 1-2 optionally include wherein providing the vehicle operator alert includes providing the vehicle operator alert to a vehicle operator.

In Example 4, the subject matter of any one or more of Examples 1-3 optionally include wherein providing the vehicle operator alert includes providing the vehicle operator alert to a third party.

In Example 5, the subject matter of any one or more of Examples 2-4 optionally include wherein the vehicle operator is in a location that is remote from the sensor.

In Example 6, the subject matter of any one or more of Examples 3-5 optionally include wherein the vehicle operator is collocated with the sensor.

In Example 7, the subject matter of any one or more of Examples 3-6 optionally include wherein providing the vehicle operator alert includes providing a vibrating pulse using a piezoelectric device.

In Example 8, the subject matter of Example 7 optionally includes wherein the piezoelectric device is integrated into a headset ear seal to transmit the vibrating pulse to a skin surface of the vehicle operator.

In Example 9, the subject matter of any one or more of Examples 2-8 optionally include wherein: the vehicle navigation sensor includes a vehicle steering sensor; and the vehicle operation alert threshold includes a maximum steering deviation threshold.

In Example 10, the subject matter of any one or more of Examples 2-9 optionally include wherein: the vehicle navigation sensor includes an attitude and heading reference system (AHRS); and receiving the vehicle operation input includes receiving, from the AHRS, a calculated attitude input, the attitude input including a heading input, a pitch input, and a yaw input.

In Example 11, the subject matter of any one or more of Examples 1-10 optionally include wherein the vehicle operation alert threshold includes a maximum heading deviation amount.

In Example 12, the subject matter of any one or more of Examples 1-11 optionally include wherein the vehicle operation alert threshold includes a maximum heading deviation rate.

In Example 13, the subject matter of any one or more of Examples 2-12 optionally include wherein: the vehicle navigation sensor includes a Global Positioning System (GPS) receiver; receiving the vehicle operation input includes receiving a calculated position from the GPS receiver; and the vehicle operation alert threshold includes a maximum position deviation.

In Example 14, the subject matter of any one or more of Examples 2-13 optionally include wherein: receiving the vehicle operation input includes receiving a navigation input from the vehicle navigation sensor; and the vehicle operation alert threshold includes a maximum navigation deviation.

In Example 15, the subject matter of Example 14 optionally includes wherein the vehicle navigation sensor includes a Flight Management System (FMS), an Instrument Landing System (ILS), a high frequency omnidirectional radio range (VOR) course navigation system, an area navigation (RNAV) system, an RNAV-augmented Global Positioning Systems (GPS RNAV), an RNAV-augmented Required Navigation Performance (RNP RNAV) system, an Automated Dependent Surveillance-Broadcast (ADS-B) system, a Traffic Collision Avoidance System (TCAS), a Terrain Awareness and Warning System (TAWS), or an enhanced Ground Proximity Warning System (eGPWS).

In Example 16, the subject matter of any one or more of Examples 1-15 optionally include wherein: the sensor includes a physiological sensor; and the vehicle operation input includes a physiological data input.

In Example 17, the subject matter of Example 16 optionally includes wherein the vehicle operator alert is configured to increase a vehicle operator alertness level.

In Example 18, the subject matter of any one or more of Examples 16-17 optionally include wherein the physiological data input includes a ballistocardiogram input, an electroencephalogram (EEG) brain activity measurement input, an electrooculogram (EOG) eye-measurement input, a pulse plethysmogram (PPG) input, a pulse oximetry sensor, an electromyogram (EMG) input, a functional near infrared (FNIR) input, a skin-sensitive potentiometer input, or a microelectromechanical (MEMS) accelerometer input.

Example 19 is a system for providing a vehicle operator alert, the system comprising: a sensor to generate a vehicle operation input; a processor configured to: determine a vehicle operator alert metric based on the vehicle operation input; compare the vehicle operator alert metric to a vehicle operator alert threshold; and generate, when the operation alert metric exceeds the vehicle operator alert threshold, an vehicle operation alert; and a feedback device to receive the vehicle operation alert and provide a vehicle operation feedback.

In Example 20, the subject matter of Example 19 optionally includes wherein: the sensor includes a vehicle navigation sensor; and the vehicle operation input includes a vehicle navigation sensor input.

In Example 21, the subject matter of any one or more of Examples 19-20 optionally include wherein the feedback device is configured to provide the vehicle operation feedback to a vehicle operator.

In Example 22, the subject matter of any one or more of Examples 19-21 optionally include wherein the feedback device is configured to provide the vehicle operation feedback to a third party.

In Example 23, the subject matter of any one or more of Examples 20-22 optionally include wherein the vehicle operator is in a location that is remote from the sensor.

In Example 24, the subject matter of any one or more of Examples 21-23 optionally include wherein the vehicle operator is collocated with the sensor.

In Example 25, the subject matter of any one or more of Examples 21-24 optionally include wherein the feedback device includes a piezoelectric device configured to provide a vibrating pulse to the vehicle operator.

In Example 26, the subject matter of any one or more of Examples 21-25 optionally include a headset, the headset including the feedback device, wherein the feedback device is positioned within the headset to transmit the vehicle operation feedback to a skin surface of the vehicle operator.

In Example 27, the subject matter of any one or more of Examples 19-26 optionally include wherein: the vehicle navigation sensor includes a navigation device configured to generate a navigation input; the vehicle operation input includes the navigation input; and the vehicle operator alert threshold includes a navigation deviation threshold.

In Example 28, the subject matter of Example 27 optionally includes wherein: the navigation device includes an attitude and heading reference system (AHRS) configured to generate a calculated attitude input, the attitude input including a heading input, a pitch input, and a yaw input; and the navigation input includes the calculated attitude input.

In Example 29, the subject matter of any one or more of Examples 27-28 optionally include wherein the navigation deviation threshold includes a maximum heading deviation amount.

In Example 30, the subject matter of any one or more of Examples 27-29 optionally include wherein the navigation deviation threshold includes a maximum heading deviation rate.

In Example 31, the subject matter of any one or more of Examples 27-30 optionally include wherein: the navigation device includes a Global Positioning System (GPS) receiver configured to generate a calculated position; and the navigation deviation threshold includes a maximum position deviation.

In Example 32, the subject matter of any one or more of Examples 27-31 optionally include wherein: wherein the vehicle operation input includes an air data input, the air data input including air pressure, altitude, vertical speed, airspeed, angle of attack (AOA), pitot, static, total air temperature (TAT), standard air temperature (SAT), or icing conditions detector; and the navigation deviation threshold is determined based on the air data input.

In Example 33, the subject matter of any one or more of Examples 27-32 optionally include wherein: the navigation device includes a VOR or ILS; the vehicle operation input includes localizer or glideslope information; and the navigation deviation threshold is determined based on the localizer or glideslope information.

In Example 34, the subject matter of any one or more of Examples 21-33 optionally include wherein: the sensor includes a physiological sensor; and the vehicle operation input includes a physiological data input.

In Example 35, the subject matter of Example 34 optionally includes wherein the vehicle operation feedback is configured to increase a vehicle operator alertness level.

In Example 36, the subject matter of any one or more of Examples 34-35 optionally include wherein the physiological sensor includes a ballistocardiogram device, an electroencephalogram (EEG) brain activity measurement device, an electrooculogram (EOG) eye-measurement device, a pulse plethysmogram (PPG) sensor, a pulse oximetry sensor, an electromyogram (EMG) sensor, a functional near infrared (FNIR) sensor, a skin-sensitive potentiometer, or a microelectromechanical (MEMS) accelerometer.

Example 37 is at least one machine-readable storage medium, comprising a plurality of instructions that, responsive to being executed with processor circuitry of a computing device, cause the computing device to: receive a vehicle operation input from a sensor; determine a vehicle operation alert metric based on the vehicle operation input; compare the vehicle operation alert metric to a vehicle operation alert threshold; and provide a vehicle operator alert when the operation alert metric exceeds the vehicle operation alert threshold.

In Example 38, the subject matter of Example 37 optionally includes wherein: the sensor includes a vehicle navigation sensor; and the vehicle operation input includes a vehicle navigation sensor input.

In Example 39, the subject matter of any one or more of Examples 37-38 optionally include the plurality of instructions further comprising additional instructions that cause the computing device to provide the vehicle operator alert to a vehicle operator.

In Example 40, the subject matter of any one or more of Examples 37-39 optionally include the plurality of instructions further comprising additional instructions that cause the computing device to provide the vehicle operator alert to a third party.

In Example 41, the subject matter of any one or more of Examples 38-40 optionally include wherein the vehicle operator is in a location that is remote from the sensor.

In Example 42, the subject matter of any one or more of Examples 39-41 optionally include wherein the vehicle operator is collocated with the sensor.

In Example 43, the subject matter of any one or more of Examples 39-42 optionally include the plurality of instructions further comprising additional instructions that cause the computing device to provide a vibrating pulse using a piezoelectric device.

In Example 44, the subject matter of Example 43 optionally includes wherein the piezoelectric device is integrated into a headset ear seal to transmit the vibrating pulse to a skin surface of the vehicle operator.

In Example 45, the subject matter of any one or more of Examples 38-44 optionally include wherein: the vehicle navigation sensor includes a vehicle steering sensor; and the vehicle operation alert threshold includes a maximum steering deviation threshold.

In Example 46, the subject matter of any one or more of Examples 38-45 optionally include the plurality of instructions further comprising additional instructions that cause the computing device to receive a calculated attitude input, the attitude input including a heading input, a pitch input, and a yaw input from an attitude and heading reference system (AHRS).

In Example 47, the subject matter of any one or more of Examples 37-46 optionally include wherein the vehicle operation alert threshold includes a maximum heading deviation amount.

In Example 48, the subject matter of any one or more of Examples 37-47 optionally include wherein the vehicle operation alert threshold includes a maximum heading deviation rate.

In Example 49, the subject matter of any one or more of Examples 38-48 optionally include the plurality of instructions further comprising additional instructions that cause the computing device to receive a calculated position from a Global Positioning System (GPS) receiver, wherein the vehicle operation alert threshold includes a maximum position deviation.

In Example 50, the subject matter of any one or more of Examples 38-49 optionally include the plurality of instructions further comprising additional instructions that cause the computing device to receive the vehicle operation input includes receiving a navigation input from the vehicle navigation sensor, wherein the vehicle operation alert threshold includes a maximum navigation deviation.

In Example 51, the subject matter of Example 50 optionally includes wherein the vehicle navigation sensor includes a Flight Management System (FMS), an Instrument Landing System (ILS), a high frequency omnidirectional radio range (VOR) course navigation system, an area navigation (RNAV) system, an RNAV-augmented Global Positioning Systems (GPS RNAV), an RNAV-augmented Required Navigation Performance (RNP RNAV) system, an Automated Dependent Surveillance-Broadcast (ADS-B) system, a Traffic Collision Avoidance System (TCAS), a Terrain Awareness and Warning System (TAWS), or an enhanced Ground Proximity Warning System (eGPWS).

In Example 52, the subject matter of any one or more of Examples 37-51 optionally include wherein: the sensor includes a physiological sensor; and the vehicle operation input includes a physiological data input.

In Example 53, the subject matter of Example 52 optionally includes wherein the vehicle operator alert is configured to increase a vehicle operator alertness level.

In Example 54, the subject matter of any one or more of Examples 52-53 optionally include wherein the physiological data input includes a ballistocardiogram input, an electroencephalogram (EEG) brain activity measurement input, an electrooculogram (EOG) eye-measurement input, a pulse plethysmogram (PPG) input, a pulse oximetry sensor, an electromyogram (EMG) input, a functional near infrared (FNIR) input, a skin-sensitive potentiometer input, or a microelectromechanical (MEMS) accelerometer input.

Each of these non-limiting examples can stand on its own, or can be combined in various permutations or combinations with one or more of the other examples.

Conventional terms in the fields of neural networks and aviation have been used herein. The terms are known in the art and are provided only as a non-limiting example for convenience purposes. Accordingly, the interpretation of the corresponding terms in the claims, unless stated otherwise, is not limited to any particular definition. Thus, the terms used in the claims should be given their broadest reasonable interpretation.

Although specific embodiments have been illustrated and described herein, it will be appreciated by those of ordinary skill in the art that any arrangement that is calculated to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer-readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read-only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure and is submitted with the understanding that it will not be used to interpret or limit the scope or meaning of the claims. In addition, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the embodiments should be determined with reference to the appended claims, along with the full scope of equivalents to which such claims are entitled.

The following statements are potential claims that may be converted to claims in a future application. No modification of the following statements should be allowed to affect the interpretation of claims, which may be drafted when this provisional application is converted into a regular utility application.

What is claimed is:

1. A method of providing an aircraft operator alert, the method comprising:
   receiving an aircraft operation input from a sensor;
   determining an aircraft operation alert metric based on the aircraft operation input;
   comparing the aircraft operation alert metric to an aircraft operation alert threshold; and
   providing an aircraft guidance correction when the operation alert metric exceeds the aircraft operation alert threshold, the aircraft guidance correction provided through one or more of a plurality of vibration devices arranged within a tactile head worn feedback device to deliver a combination of one or more vibration pulses to specific locations on a head of an aircraft operator, the aircraft guidance correction vibration pulses uniquely identifying an aircraft maneuver and instructing the aircraft operator to execute the aircraft maneuver.

2. The method of claim 1, wherein:
the sensor includes an aircraft navigation sensor;
the aircraft operation input includes an aircraft navigation sensor input; and
the aircraft guidance correction includes an aircraft course correction.

3. The method of claim 2, wherein:
the aircraft navigation sensor includes an aircraft steering sensor;
the aircraft operation alert threshold includes a maximum steering deviation threshold; and
the generation of the aircraft guidance correction includes generation of a three-dimensional guidance correction.

4. The method of claim 2, wherein:
the aircraft navigation sensor includes an aircraft attitude and heading sensor; and
receiving the aircraft operation input includes receiving, from the aircraft attitude and heading sensor, a calculated attitude input, the attitude input including a heading input, a pitch input, and a yaw input.

5. The method of claim 2, wherein:
the aircraft navigation sensor includes a Global Positioning System (GPS) receiver;
receiving the aircraft operation input includes receiving a calculated position from the GPS receiver; and
the aircraft operation alert threshold includes at least one of a maximum position deviation, a maximum angular deviation, or a lateral cross-track course deviation.

6. The method of claim 2, wherein:
the aircraft navigation sensor includes a situational awareness system, the situational awareness system including at least one of a Flight Management System, an Instrument Landing System, a very high frequency omnidirectional radio range course navigation system, an area navigation system, a Required Navigation Performance system, a Traffic Collision Avoidance System, a Terrain Awareness and Warning System, an Automated Dependent Surveillance-Broadcast system, and a Ground Proximity Warning System;
receiving the aircraft operation input includes receiving a navigation input from the aircraft navigation sensor; and
the aircraft operation alert threshold includes a maximum situational awareness deviation.

7. The method of claim 6, wherein:
the sensor further includes a pulse plethysmogram (PPG) physiological sensor; and
the aircraft operation input includes a physiological data input.

8. The method of claim 7, wherein the tactile operator feedback alert is configured to increase an aircraft operator alertness level.

9. A system for providing an aircraft operator alert, the system comprising:
a sensor to generate an aircraft operation input;
a processor configured to:
determine an aircraft operator alert metric based on the aircraft operation input;
compare the aircraft operator alert metric to an aircraft operator alert threshold; and
generate, when the operation alert metric exceeds the aircraft operator alert threshold, an aircraft maneuver to provide a guidance correction; and
a tactile head worn feedback device to receive the aircraft maneuver and provide a tactile aircraft guidance feedback through one or more of a plurality of vibration devices arranged within the tactile head worn feedback device to deliver a combination of one or more vibration pulses to specific locations on a head of an aircraft operator, the aircraft guidance feedback vibration pulses uniquely identifying the aircraft maneuver and instructing the aircraft operator to execute the aircraft maneuver.

10. The system of claim 9, wherein:
the sensor includes an aircraft navigation sensor;
the aircraft operation input includes an aircraft navigation sensor input; and
the aircraft guidance correction includes an aircraft course correction.

11. The system of claim 9, wherein the feedback device includes a vibration device configured to provide a vibrating pulse to the aircraft operator.

12. The system of claim 10, wherein:
the aircraft navigation sensor includes a navigation device configured to generate a navigation input;
the aircraft operation input includes the navigation input;
the aircraft operator alert threshold includes a navigation deviation threshold; and
the generation of the aircraft guidance correction includes generation of a three-dimensional guidance correction.

13. The system of claim 12, wherein:
the navigation device includes an aircraft attitude and heading sensor configured to generate a calculated attitude input, the attitude input including a heading input, a pitch input, and a yaw input; and
the navigation input includes the calculated attitude input.

14. The system of claim 12, wherein:
the navigation device includes a situational awareness system, the situational awareness system including at least one of a Flight Management System, an Instrument Landing System, a very high frequency omnidirectional radio range course navigation system, an area navigation system, a Required Navigation Performance system, a Traffic Collision Avoidance System, a Terrain Awareness and Warning System, an Automated Dependent Surveillance-Broadcast system, and a Ground Proximity Warning System;
the navigation deviation threshold includes a maximum situational awareness deviation amount.

15. The system of claim 12, wherein:
the navigation device includes a Global Positioning System (GPS) receiver configured to generate a calculated position; and
the navigation deviation threshold includes at least one of a maximum position deviation, a maximum angular deviation, or a lateral cross-track course deviation.

16. The system of claim 9, wherein:
the sensor further includes a physiological sensor, the physiological sensor including a pulse plethysmogram (PPG) sensor; and
the aircraft operation input includes a physiological data input.

17. The system of claim 16, wherein the tactile aircraft operation feedback is configured to increase an aircraft operator alertness level.

18. The system of claim 16, wherein the physiological sensor further includes a ballistocardiogram device, an electroencephalogram (EEG) brain activity measurement device, an electrooculogram (EOG) eye-measurement device, a pulse oximetry sensor, an electromyogram (EMG) sensor, a functional near infrared (FNIR) sensor, a skin-sensitive potentiometer, or a microelectromechanical (MEMS) accelerometer.

* * * * *